UNITED STATES PATENT OFFICE.

ROBERT BATES, OF ATHENS, TENNESSEE.

POLISH.

1,305,684.

Specification of Letters Patent.

Patented June 3, 1919.

No Drawing.

Application filed August 6, 1918. Serial No. 248,650.

*To all whom it may concern:*

Be it known that I, ROBERT BATES, a citizen of the United States, residing at Athens, in the county of McMinn and State of Tennessee, have invented certain new and useful Improvements in Polishes, of which the following is a specification.

My improved polish comprises a composition of elements having detergent as well as polishing properties, whereby the surface or articles operated upon will be cleaned and polished to a luster at one and the same operation.

The composition generally consists of a gum or sap from wild grape vines, water, and alcohol, all mixed in the proportions to be hereafter specified.

The substance is obtained from the grape vine by taking the body of the grape vine, preferably growing near a running stream or in wet land, and cutting it into pieces so that the sap therefrom will pass into suitable containers. This substance may be allowed to stand until it congeals or solidifies, and is then ready to be mixed with the other ingredients of the composition. Preferably the matter obtained from the grape vine is mixed in suitable proportions with water and is then subjected to a temperature of about 90 degrees Fahrenheit for forty-eight hours. A quantity of alcohol may then be added to the mixture and the composition is ready for use.

The formula which has produced excellent results consists in taking one and two-thirds quarts of liquid gum from the grape-vine, three quarts of water, and one-third pint of alcohol. After being thoroughly mixed the polish may be applied with a sponge or brush. After application, the best results are obtained by allowing the article or surface to remain for a period of five or more minutes, and may then be treated with a smooth or coarse cloth as desired. Rubbing of the surface coated with the composition will cause the surface to become clean and a brilliant luster will result from the friction due to the rubbing operation.

This polish is designed particularly for glass and chinaware, household utensils and all kinds of metal.

The proportions above set forth, as well as the means of mixing and applying the composition, is preferred, but it will be understood that variations in the quantities used, the degree of heat to which the composition is subjected, the length of time which it is allowed to remain and the manner of application may be varied if desired, without departing from the spirit of the invention.

I claim:—

1. The herein described composition consisting of grapevine gum, water and alcohol.

2. The herein described polishing composition comprising grape-vine gum, an alcoholic liquid and water.

3. The herein described composition of matter comprising wild grape-vine juice one and two-thirds quarts, pure water three quarts, and alcohol one-third pint.

In testimony whereof I affix my signature in presence of two witnesses.

ROBERT BATES.

Witnesses:
R. P. KNIGHT,
AMOS HALLOMAN.